US009256626B2

(12) United States Patent
Jaquet et al.

(10) Patent No.: US 9,256,626 B2
(45) Date of Patent: Feb. 9, 2016

(54) MAINTAINING MULTIPLE COPY VERSIONS OF COMPONENT VALUES IN A SYSTEM

(75) Inventors: Stefan Jaquet, Morgan Hill, CA (US); Arvind C. Surve, San Jose, CA (US); Raymond M. Swank, San Jose, CA (US); Cindy Zhou, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 13/448,134

(22) Filed: Apr. 16, 2012

(65) Prior Publication Data

US 2013/0275377 A1 Oct. 17, 2013

(51) Int. Cl.
*G06F 7/00* (2006.01)
*G06F 17/30* (2006.01)

(52) U.S. Cl.
CPC ............... *G06F 17/30309* (2013.01)

(58) Field of Classification Search
None
See application file for complete search history.

(56) References Cited

U.S. PATENT DOCUMENTS

| 7,769,731 | B2 * | 8/2010 | O'Brien | 707/694 |
| 7,836,029 | B2 * | 11/2010 | Shoens | 707/695 |
| 2008/0307017 | A1 * | 12/2008 | Lyons et al. | 707/204 |
| 2011/0191299 | A1 | 8/2011 | Huu et al. | |

* cited by examiner

*Primary Examiner* — Hosain Alam
*Assistant Examiner* — Thu Nga Nguyen
(74) *Attorney, Agent, or Firm* — David W. Victor; Konrad, Raynes, Davda and Victor LLP

(57) ABSTRACT

Provided are a computer program product, system, and method for maintaining multiple copy versions of component values in a system. A database includes entries for components in a system, wherein there is one entry for each of a plurality of component values associated with a component, wherein each entry indicates a range of copy versions for which the component value applies. A copy operation is performed at a current time to create a current copy version. A determination is made as to whether the component values for the components at the current time have changed since a previous copy version. The previous copy version is maintained in the database and immediately precedes the current copy version. For each component value that has changed, the entry for the component having the open indicator as the end copy version is updated to indicate the previous copy version as the end copy version.

19 Claims, 15 Drawing Sheets

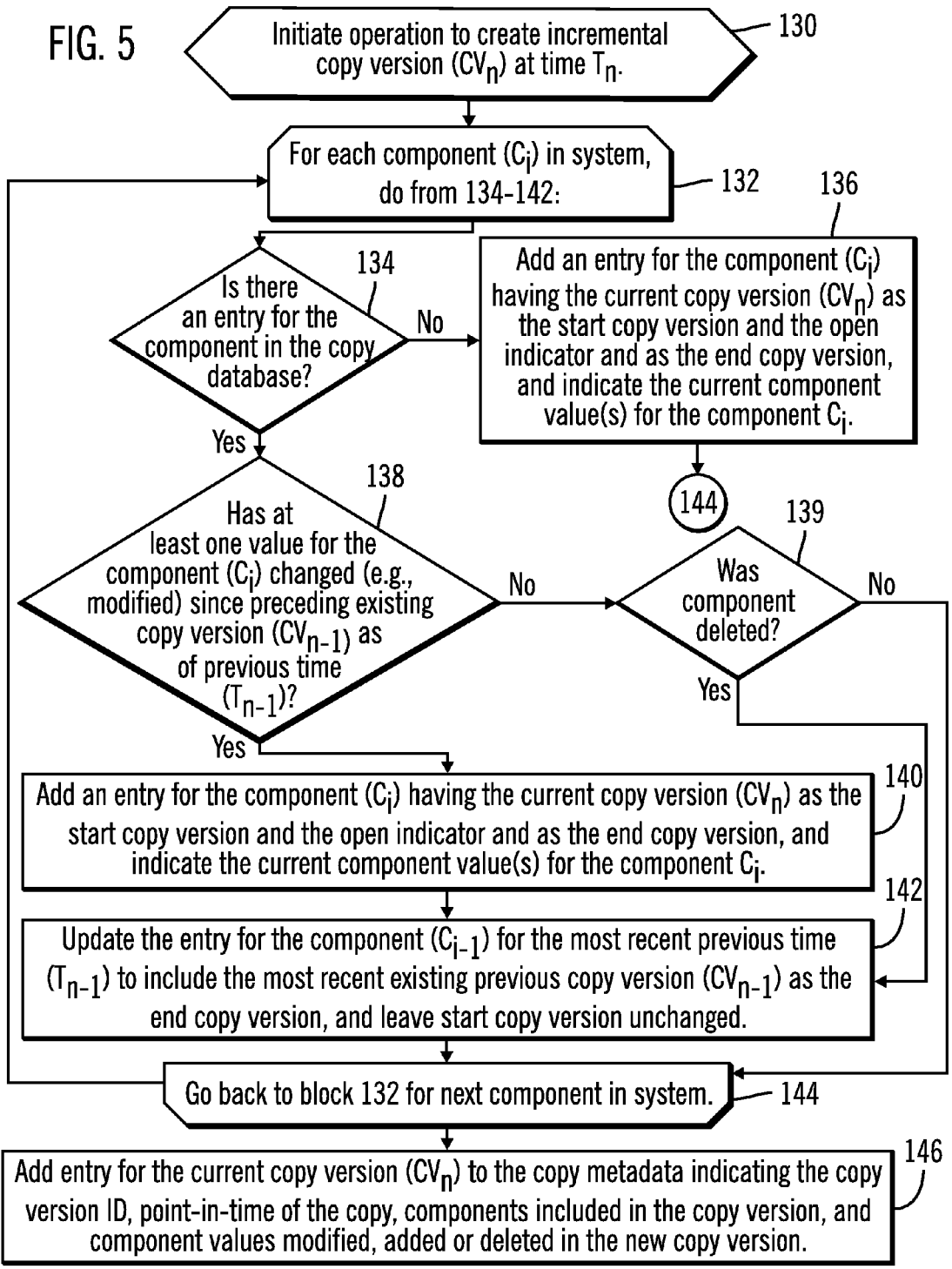

COPY VERSION 1 SAVED

| Component | Start Copy Version | End Copy Version | Value | Description |
|---|---|---|---|---|
| 1 | 1 | -1 | A1 | Value for entity 1 is A1 valid from copy 1 to current time. |
| 2 | 1 | -1 | A2 | Value for entity 2 is A2 valid from copy 1 to current time. |
| 3 | 1 | -1 | A3 | Value for entity 3 is A3 valid from copy 1 to current time. |

FIG. 6

COPY VERSION 2 SAVED

| Component | Start Copy Version | End Copy Version | Value | Description |
|---|---|---|---|---|
| 1 | 1 | -1 | A1 | Value for entity 1 is A1 valid from copy 1 to current time. |
| 2 | 1 | [-1] 1 | A2 | Value for entity 2 is A2 valid for copy 1. |
| 2 | 2 | -1 | B2 | Value for entity 2 is B2 valid from copy 2 to current time. |
| 3 | 1 | [-1] 1 | A3 | Value for entity 3 is A3 valid for copy 1. |
| 3 | 2 | -1 | B3 | Value for entity 3 is B3 valid from copy 2 to current time. |

FIG. 7

COPY VERSION 3 SAVED

| Component | Start Copy Version | End Copy Version | Value | Description |
|---|---|---|---|---|
| 1 | 1 | -1 | A1 | Value for entity 1 is A1 valid from copy 1 to current time. |
| 2 | 1 | 1 | A2 | Value for entity 2 is A2 valid for copy 1. |
| 2 | 2 | [-1] 2 | B2 | Value for entity 2 is B2 valid for copy 2. |
| 2 | 3 | -1 | C2 | Value for entity 2 is C2 valid from copy 3 to current time. |
| 3 | 1 | 1 | A3 | Value for entity 3 is A3 valid for copy 1. |
| 3 | 2 | -1 | B3 | Value for entity 3 is B3 valid from copy 2 to current time. |
| 4 | 3 | -1 | A4 | Value for entity 4 is A4 valid from copy 3 to current time. |

FIG. 8

COPY VERSION 4 SAVED

| Component | Start Copy Version | End Copy Version | Value | Description |
|---|---|---|---|---|
| 1 | 1 | -1 | A1 | Value for entity 1 is A1 valid from copy 1 to current time. |
| 2 | 1 | 1 | A2 | Value for entity 2 is A2 valid for copy 1. |
| 2 | 2 | 2 | B2 | Value for entity 2 is B2 valid for copy 2. |
| 2 | 3 | [-1] 3 | C2 | Value for entity 2 is C2 valid for copy 3. |
| 3 | 1 | 1 | A3 | Value for entity 3 is A3 valid for copy 1. |
| 3 | 2 | -1 | B3 | Value for entity 3 is B3 valid from copy 2 to current time. |
| 4 | 3 | -1 | A4 | Value for entity 4 is A4 valid from copy 3 to current time. |

COPY VERSION 5 SAVED

| Component | Start Copy Version | End Copy Version | Value | Description |
|---|---|---|---|---|
| 1 | 1 | -1 | A1 | Value for entity 1 is A1 valid from copy 1 to current time. |
| 2 | 1 | 1 | A2 | Value for entity 2 is A2 valid for copy 1. |
| 2 | 2 | 2 | B2 | Value for entity 2 is B2 valid for copy 2. |
| 2 | 3 | 3 | C2 | Value for entity 2 is C2 valid for copy 3. |
| 3 | 1 | 1 | A3 | Value for entity 3 is A3 valid for copy 1. |
| 3 | 2 | [-1] 4 | B3 | Value for entity 3 is B3 valid from copy 2 until copy 4. |
| 3 | 5 | -1 | C3 | Value for entity 3 is C3 valid from copy 5 to current time. |
| 4 | 3 | -1 | A4 | Value for entity 4 is A4 valid from copy 3 to current time. |

FIG. 10

COPY VERSION 1 DELETED

| Component | Start Copy Version | End Copy Version | Value | Description |
|---|---|---|---|---|
| 1 | [1] 2 | -1 | A1 | Value for entity 1 is A1 valid from copy 2 to current time. |
| ~~2~~ | ~~1~~ | ~~1~~ | ~~A2~~ | DELETED |
| 2 | 2 | 2 | B2 | Value for entity 2 is B2 valid for copy 2. |
| 2 | 3 | 3 | C2 | Value for entity 2 is C2 valid for copy 3 only. |
| ~~3~~ | ~~1~~ | ~~1~~ | ~~A3~~ | DELETED |
| 3 | 2 | 4 | B3 | Value for entity 3 is B3 valid from copy 2 until copy 4. |
| 3 | 5 | -1 | C3 | Value for entity 3 is C3 valid from copy 5 to current time. |
| 4 | 3 | -1 | A4 | Value for entity 4 is A4 valid from copy 3 to current time. |

FIG. 12

COPY VERSION 4 DELETED

| Component | Start Copy Version | End Copy Version | Value | Description |
|---|---|---|---|---|
| 1 | 2 | -1 | A1 | Value for entity 1 is A1 valid from copy 2 to current time. |
| 2 | 2 | 2 | B2 | Value for entity 2 is B2 valid for copy 2. |
| 2 | 3 | 3 | C2 | Value for entity 2 is C2 valid for copy 3. |
| 3 | 2 | [4] 3 | B3 | Value for entity 3 is B3 valid from copy 2 to copy 3. |
| 3 | 5 | -1 | C3 | Value for entity 3 is C3 valid from copy 5 to current time. |
| 4 | 3 | -1 | A4 | Value for entity 4 is A4 valid from copy 3 to current time. |

COPY VERSION 3 DELETED

| Component | Start Copy Version | End Copy Version | Value | Description |
|---|---|---|---|---|
| 1 | 2 | -1 | A1 | Value for entity 1 is A1 valid from copy 2 to current time. |
| 2 | 2 | 2 | B2 | Value for entity 2 is B2 valid for copy 2. |
| ~~2~~ | ~~3~~ | ~~3~~ | ~~C2~~ | DELETED |
| 3 | 2 | [3] 2 | B3 | Value for entity 3 is B3 valid for copy 2. |
| 3 | 5 | -1 | C3 | Value for entity 3 is C3 valid from copy 5 to current time. |
| 4 | [3] 5 | -1 | A4 | Value for entity 4 is A4 valid from copy 3 to current time. |

COPY VERSION 2 DELETED

| Component | Start Copy Version | End Copy Version | Value | Description |
|---|---|---|---|---|
| 1 | [2] 5 | -1 | A1 | Value for entity 1 is A1 valid from copy 5 to current time. |
| ~~2~~ | ~~2~~ | ~~2~~ | ~~B2~~ | DELETED |
| ~~3~~ | ~~2~~ | ~~2~~ | ~~B3~~ | DELETED |
| 3 | 5 | -1 | C3 | Value for entity 3 is C3 valid from copy 5 to current time. |
| 4 | 5 | -1 | A4 | Value for entity 4 is A4 valid from copy 5 to current time. |

COPY VERSION 5 DELETED

| Component | Start Copy Version | End Copy Version | Value | Description |
|---|---|---|---|---|
| ~~1~~ | ~~5~~ | ~~-1~~ | ~~A1~~ | DELETED |
| ~~3~~ | ~~5~~ | ~~-1~~ | ~~C3~~ | DELETED |
| ~~4~~ | ~~5~~ | ~~1~~ | ~~A4~~ | DELETED |

FIG. 16

MAINTAINING MULTIPLE COPY VERSIONS OF COMPONENT VALUES IN A SYSTEM

BACKGROUND OF THE INVENTION

1. Field of the Invention

The present invention relates to a computer program product, system, and method for maintaining multiple copy versions of component values in a system.

2. Description of the Related Art

State information for a computing environment may be stored in a computer database, consisting of multiple tables, that track the current state of some environment (E), as well as the historical changes of E at different points-in-time. As E changes over time, historical information is saved in the database tables, such that E1, E2, E3, etc. represent the historical state of E at some point in time T1, T2, T3, etc. in the past. Each such En is termed a "snapshot" of E.

The entire environment E may be saved in multiple tables S1, S2, S3, etc. where each table contains multiple rows of information. Each row represents the state of a particular component of E at a particular point in time. For instance, $S_{xyz}$ can denote the row in table $S_x$ for component $C_y$ at time $T_z$. Therefore, a snapshot of the environment $E_n$ at a time $T_n$ can be expressed by the set of rows $S_{11n}, S_{12n}, S_{13n} \ldots S_{21n}, S_{22n}, S_{23n}, \ldots S_{m1n}, S_{m2n}, S_{m3n} \ldots$ where m is the total number of tables in the database. To record a new historical snapshot for E at time t+1, a new set of rows $S_{11n+1}, S_{12n+1}, S_{13n+1}, \ldots S_{21n+1}, S_{22n+1}, S_{23n+1}, \ldots S_{m1n+1}, S_{m2n+1}, S_{m3n+1} \ldots$ may be written to the database.

To avoid the database from growing too large, the administrator may limit the overall time range T1 ... Tn of snapshot copies represented in the database.

There is a need in the art for improved techniques for storing multiple snapshot copies of a system environment.

SUMMARY

Provided are a computer program product, system, and method for maintaining multiple copy versions of component values in a system. A database includes entries for components in a system, wherein there is one entry for each of a plurality of component values associated with a component, wherein each entry indicates a range of copy versions for which the component value applies, wherein the range of copy versions indicates one of (i) a start copy version and an end copy version defining at least one copy version during which the component value is applicable value or (ii) a start copy version and an open indicator indicating that the component value is currently applicable from the start copy version. A copy operation is performed at a current time to create a current copy version. A determination is made as to whether the component values for the components at the current time have changed since a previous copy version. The previous copy version is maintained in the database and immediately precedes the current copy version. For each component value that has changed, the entry for the component having the open indicator as the end copy version is updated to indicate the previous copy version as the end copy version.

BRIEF DESCRIPTION OF THE DRAWINGS

FIG. 5 illustrates an embodiment of operations to create a new copy version of component values following the initial copy version.

FIGS. 6-10 illustrate examples of changes to component entries as a result of saving copy versions.

FIGS. 12-16 illustrate examples of changes to component entries as a result of deleting a copy version.

DETAILED DESCRIPTION

Described embodiments provide techniques to store copy versions of component values for components in a system at different points-in-time. A database includes entries for components in a system that indicates one or more copy versions associated with component values of the components in the system. When component values change, the entries having current component values are changed to indicate that the entries have component values for previous copy versions and a new entry is added. Further, existing entries for component values are updated when copy versions are deleted to reflect the removal of the copy version from the database.

Figure 1:
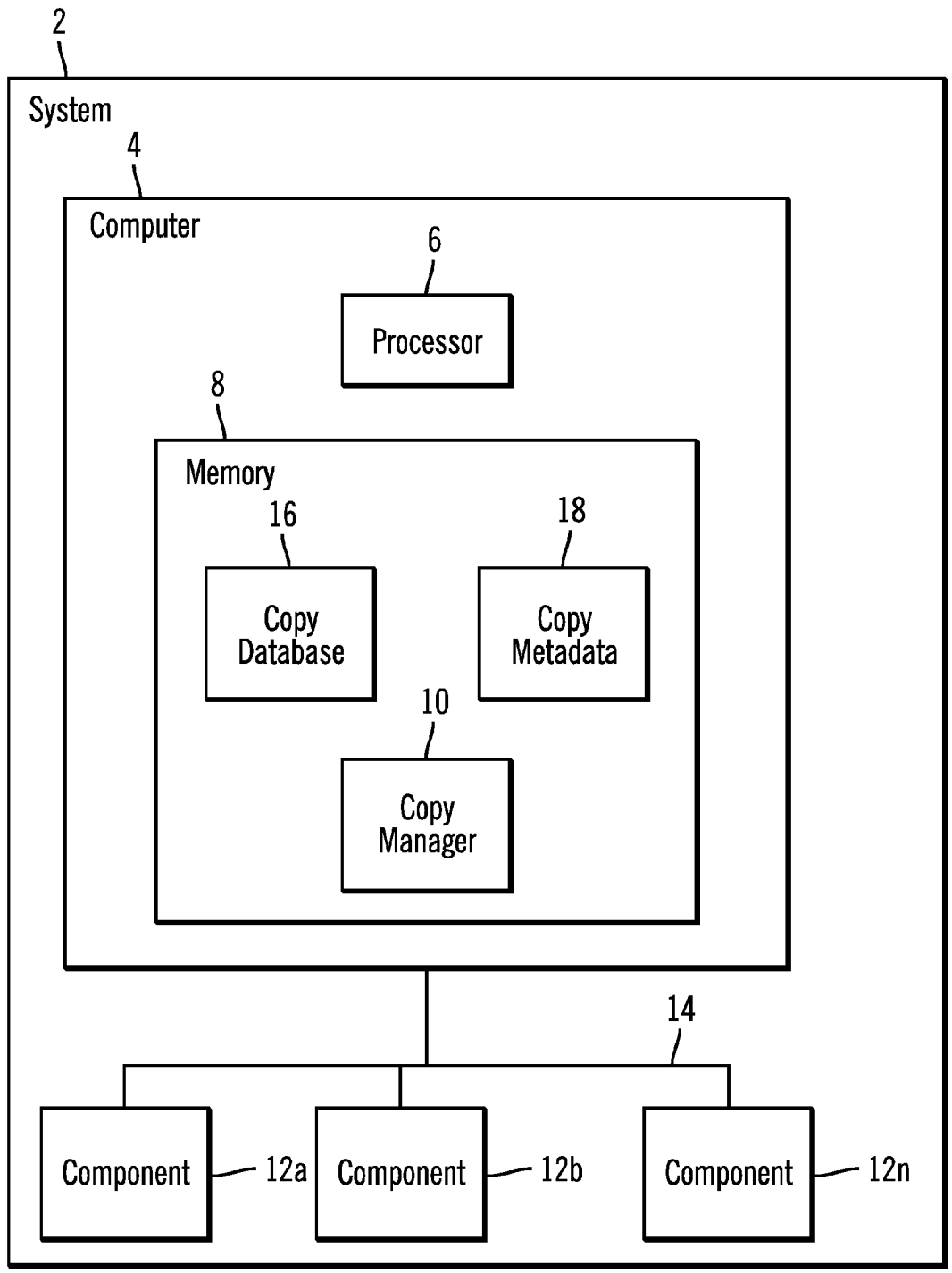
FIG. 1 illustrates an embodiment of a computing environment.

FIG. 1 illustrates an embodiment of a system 2 having a computer 4 including a processor 6, comprising one or more central processing units (CPUs), and a memory 8 including various programs executed by the processor 6. The processor 6 executes various programs in the memory 8 including a copy manager 10 that takes snapshot copies as of different points-in-time of an environmental state of components 12a, 12b ... 12n, where "n" indicates any number of instances of the components. The environmental state ($E_i$) as of a point-in-time ($T_i$) may comprise component values (CV) that indicate state information, configuration information, variables, etc. related to the components 12a, 12b ... 12n as of the point-in-time ($T_i$).

The memory 8 may comprise one or more memory devices to store programs executed by the processor 6, such as a Dynamic Random Access Memory (DRAM), Random Access Memory (RAM), cache, Flash Memory, Solid State Device (SSD), etc. The components 12a, 12b ... 12n may comprise devices to which the computer 4 may connect over an interface 14, such as a bus, network (e.g., Intranet, Internet, Local Area Network (LAN), Storage Area Network (SAN), etc.), cable, wireless transmission media, etc. The components 12a, 12b ... 12n may comprise computational devices, such as servers, computers, printers, cellular phones, telephony devices, tablets, etc., storage devices or other computational resources. For instance, the components 12a, 12b ... 12n may comprise storage volumes or arrays configured in storage devices. The components 12a, 12b ... 12n may further include computational resources of the computer 4. The information in the copy database 16 and copy metadata 18 may be stored in non-volatile storage devices and volatile memory devices.

The copy manager 10 maintains a copy database 16 that includes an entry for each component, e.g., an instance of state information for the component, for the components 12a, 12b ... 12n in the system 2 that is determined when creating a copy version to maintain component values of the system 2 as of a point-in-time to provide a snapshot of the environment of the system 2 and its components 12a, 12b ... 12n. Each entry in the copy database 16 for a component 12, 12b ... 12n may have one or more component values, such as state information configuration information, operational values, etc. The copy manager 10 further maintains copy metadata 18 that includes an entry or information on each copy version instance for which component values are maintained in the copy database 16.

The copy manager program 10 may comprise software programs in a memory 8 executed by the processor 6. In an alternative embodiment, some portion or all of the programs may be implemented in a hardware component, such as a dedicated integrated circuit, e.g., Application Specific Integrated Circuit (ASIC), expansion card, etc.

Figure 2:
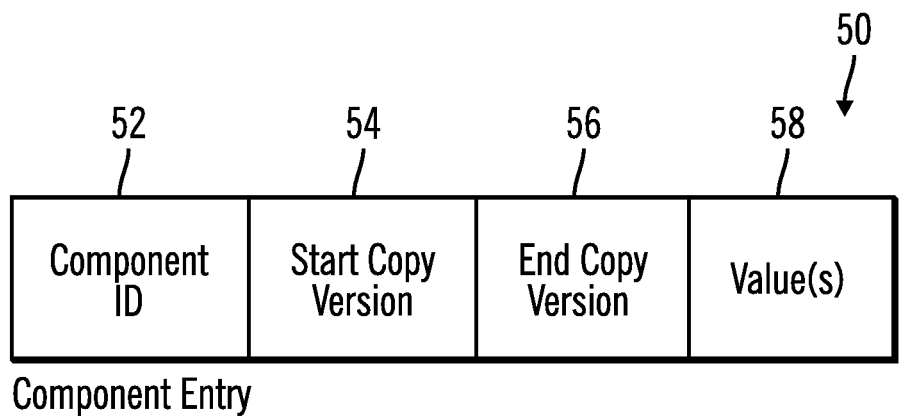
FIG. 2 illustrates an embodiment of a component entry in a copy database.

FIG. 2 illustrates an embodiment of a component entry 50 in the copy database 16 including a component identifier (ID) 52 identifying a component 12a, 12b ... 12n, a start copy version 54, an end copy version 56 and one or more values 58 associated with the component. The copy versions comprise a copy of component values for all the components 12a, 12b ... 12n or a subset of components in the system 2 at a point-in-time. Thus, each copy version is associated with a time at which the copy was made. The start 54 and end 56 copy versions indicate a range of one or more copy versions at different points-in-time that include the values 58, where the copy versions in the range of copy versions between the start 54 and end 56 copy versions occur between the point-in-times for the start 54 and end 56 copy versions. The end copy version 56 may indicate a specific copy version or include an open indicator indicating that the values 58 are applicable from the start copy version 54 to the present, i.e., a current time ($T_n$).

The entries 50 for components in the copy database 16 may be stored in one or more tables. For instance, there may be tables dedicated to specific components 12a, 12b ... 12n, tables dedicated to specific copy versions, etc.

Figure 3:
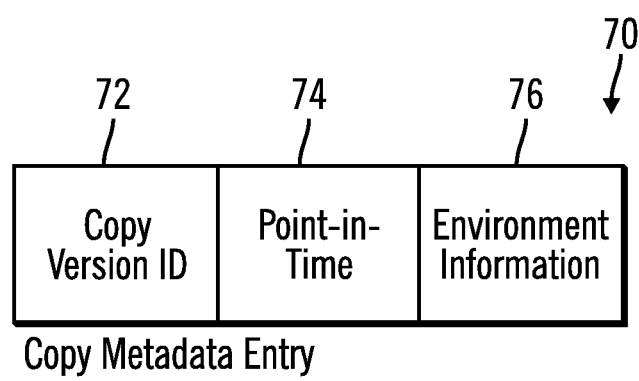
FIG. 3 illustrates an embodiment of a copy metadata entry in copy metadata.

FIG. 3 illustrates an embodiment of a copy metadata entry 70 in the copy metadata 18 that indicates the copy version ID 72 of a copy version; a point-in-time 74 to which the copy relates; and environment information 76 on the type of environment to be copied. The copy metadata 18 provides indication of all valid copy versions maintained in the copy database 16. Removal of an entry 70 for a copy version in the copy metadata 18 indicates that the copy version has been deleted from the copy database 16 and is no longer available for restore operations.

Figure 4:
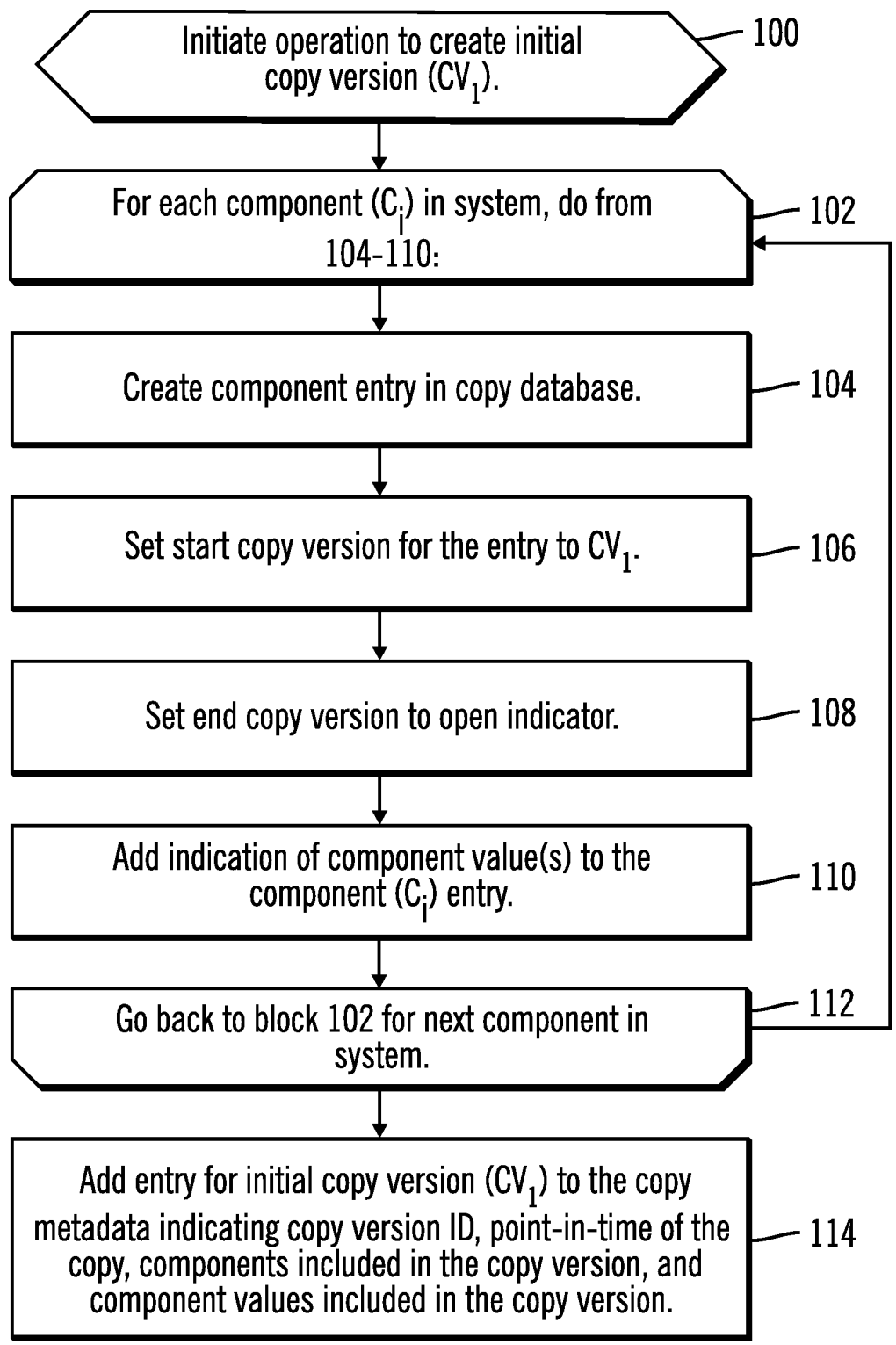
FIG. 4 illustrates an embodiment of operations to create an initial copy version of component values for components in a system.

FIG. 4 illustrates an embodiment of operation performed by the copy manager 10 to create an initial or first copy version ($CV_1$) to copy state information of components 12a, 12b ... 12n in the system 2 as of an initial time ($T_1$). Upon initiating (at block 100) the operation to create an initial copy version, or full copy version, the copy manager 10 performs a loop of operations at block 102 through 112 for each component ($C_i$) in the system 2. At block 104, the copy manager 10 creates a component entry 50 in the copy database 16 for the component ($C_i$) and sets (at block 106) the start copy version 54 for the entry to the initial copy version ($CV_1$) being created. The end copy version 56 is set to the open indicator, which may comprise any alpha-numeric value, to indicate that the component value(s) in the entry 70 are currently valid. Indication of the component values are added to the values 58 of the component entry 70. The actual component values or a pointer or address of the values may be added to the values 58 section of the entry 50. A metadata entry 70 is added to the copy metadata 18 for the initial copy version ($CV_1$) indicating a copy version ID 72, a point-in-time 74 of the copy version, and environment information 76 on the type of environment to be copied.

FIG. 5 illustrates an embodiment of operations performed by the copy manager 10 to create an incremental copy version following the initial copy version ($CV_1$), which adds only changed component values to the copy database 16 to conserve the amount of space used in the copy database 16 to store component values. Upon initiating (at block 130) an operation to create a new, incremental copy version (CVn) at a current time ($T_n$) following the initial created copy version ($CV_1$), the copy manager 10 performs a loop of operations at block 132 through 144 for each component ($C_i$) 12a, 12b ... 12n in the system. The copy manager 10 determines (at block 134) whether there is an entry 50 in the copy database 16 for the component (Ci) being considered. If not, then the copy manager 10 adds (at block 136) a component entry 50 (FIG. 2) in the copy database 16 indicating the current copy version (CVn) being created as the start copy version 54 and the open indicator as the end copy version 56, and indicates the determined component ($C_i$) value(s). After creating the component entry 50, control proceeds to block 144 to consider the next component.

If (at block 134) there is an entry 50 in the copy database 16 for the component ($C_i$) being considered, then the copy manager 10 determines (at block 138) whether at least one value for the component ($C_i$) has changed, i.e., been modified, since the most recent previous existing copy version ($CV_{n-1}$) in the copy database 16. The copy metadata 18 indicates existing copy versions. If (at block 138) at least one component value for the component ($C_i$) being considered has not changed, then the copy manager 10 determines (at block 139) whether the component ($C_i$) was deleted. If not, control proceeds to block 144 to consider the next component. Otherwise, if (at block 139) the component was deleted, then the copy manager 10 updates (at block 142) the entry 50 for the component ($C_i$) having the open indicator to include the most recent existing previous copy version ($CV_{n-1}$) as the end copy version 54, and leaves the start copy version 52 unchanged. This modifies the current component entry 50 for the component ($C_i$) to indicate that the values maintained for the previously existing component entry 50 are not current, but are valid only through the most recent existing previous copy version ($C_{i-1}$).

If (at block 138) there is at least one changed or modified component value for the component ($C_i$) being considered, then the copy manager 10 adds (at block 140) a new entry 50 for the component ($C_i$) having the current copy version ($CV_n$) being created as the start copy version 54 and the open indicator as the end copy version 56, and indicates the current component value(s) as the values 58 for the component $C_i$. This newly created entry 50 now has the current values for the component ($C_i$) being considered. For the changed component, the copy manager further updates (at block 142) the entry 50 for the most recent previous version of the component ($C_i$) for the most recent previous time ($T_{n-1}$) to include the most recent existing previous copy version ($CV_{n-1}$) as the end copy version 54, and leaves the start copy version 52 unchanged. This modifies the component entry 50 for the component ($C_i$) for the previous time ($T_{n-1}$) to indicate that the values maintained for the previously existing component entry 50 are not current, but are valid only through the most recent existing previous copy version ($T_{n-1}$).

The copy manager 10 adds (at block 146) a copy metadata entry 70 for the current copy version ($CV_n$) being created to the copy metadata 18 indicating the copy version ID 72, point-in-time 74 when the current copy version (CVn) was created, and environment information 76 on the type of environment to be copied.

FIGS. 6-10 provide examples of how copy versions are added to the copy database 16 according to the operations of FIGS. 4 and 5. The examples include a description column explaining the copy versions for which the component value is applicable.

FIG. 6 illustrates the saving of entries in the copy database 16 for an initial copy version taken at a time ($T_1$) when the system 2 has values A1, A2, and A3 for three components 1, 2, 3, respectively. All the entries in FIG. 6 are added according to the operations of FIG. 4. In the FIGS. 6-10, the open indicator comprises the value "−1".

FIG. 7 illustrates an example of saving a second copy version 2 taken after two new values B2 and B3 are added for components 2 and 3, respectively. For the second copy version 2, two entries 170 and 172 are added for the two new component values B2 and B3 for components 2 and 3, respectively. Pre-existing entries 174 and 176, having the initial values A2 and A3 for components 2 and 3, are updated to replace the open indicator (−1), shown in brackets, with the most recent existing copy version 1 as the end copy version 56.

FIG. 8 illustrates an example of saving a third copy version 3 that occurs after new values C2 and A4 for components 2 and 4 are added. Entries 180 and 182 are added in copy version 3 for the new components C2 and A4. The pre-existing entry 184 is updated to replace the open indicator (−1), shown in brackets, with the most recent existing previous copy version 2 as the end copy version 56 because the newer entry 180 provides the current version of the component 2 value.

FIG. 9 illustrates an example of a fourth copy version 4 that occurs after the second component 2 is deleted. The current entry 186 for the second component 2, identified as the entry having the open indicator, e.g., "−1" in this example, is updated to reflect the most recent copy version 3 as the end copy version 56, because the component value C2 will not appear in any subsequent copy versions because the component 2 was deleted between copy versions 3 and 4, so the value only exists in copy versions prior to copy version 4.

FIG. 10 illustrates an example of saving a fifth copy version 5 that occurs after a new component value C3 is added for component 3 by adding a new entry 188 for the new component value C3. Further the entry 190 for the previous current value B3 for component 3 is updated to indicate the previous existing copy version 4 as the end copy version 56 of that updated component value B3.

Figure 11:
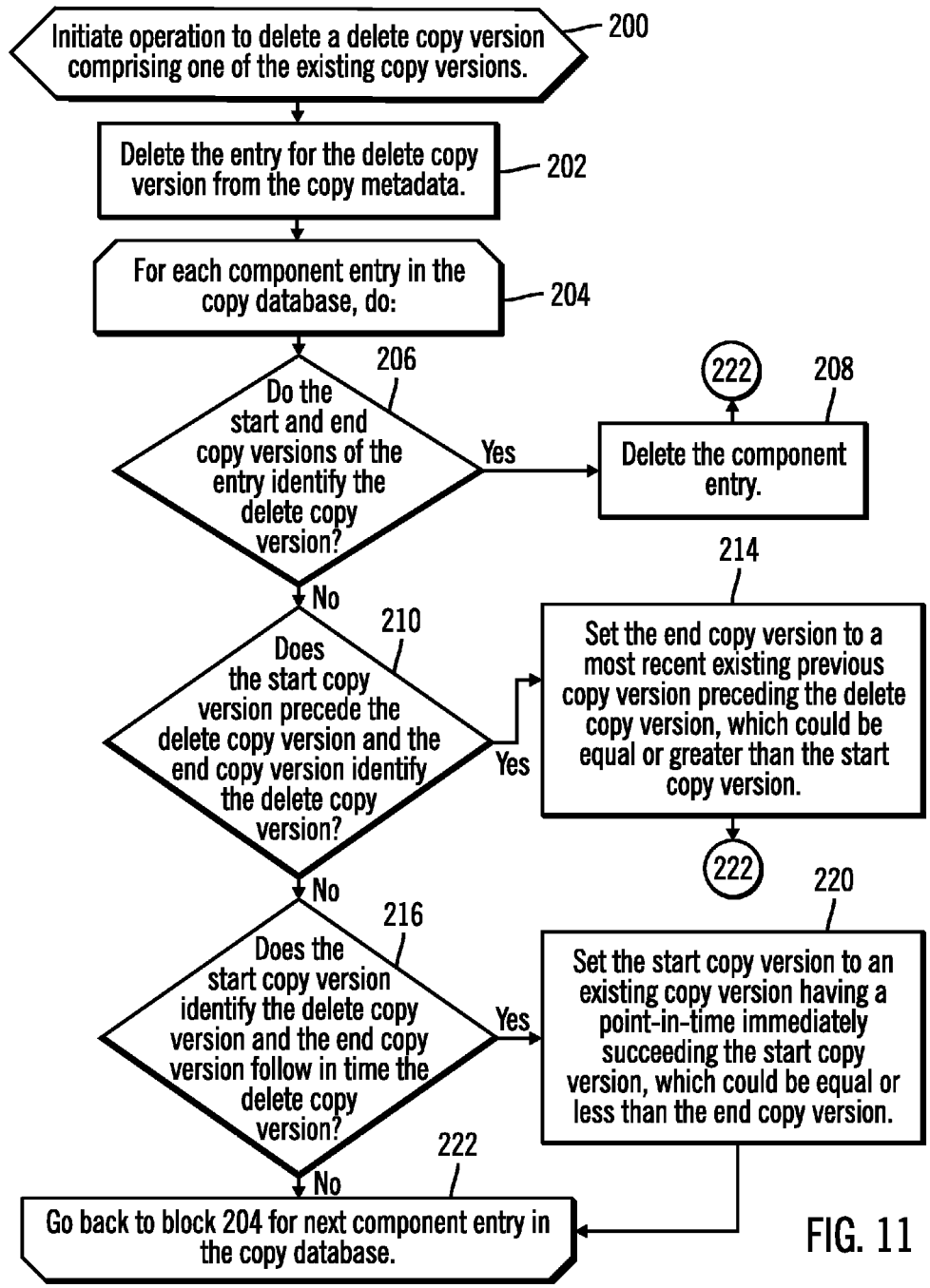
FIG. 11 illustrates an embodiment of operations to delete a copy version.

FIG. 11 illustrates an embodiment of operations performed by the copy manager 10 to delete an existing copy version from the copy database 16, referred to as a delete copy version. Upon initiating (at block 200) the operation to delete a specified delete copy version, the copy manager 10 deletes (at block 202) the entry 70 for the delete copy version from the copy metadata 18, thus indicating that that particular version no longer exists in the copy database 16. A loop of operations is performed at blocks 204 through 222 for each component entry 50 in the copy database 16. At block 206, a determination is made (at block 206) as to whether the start 54 and end 56 copy versions for the considered component entry both identify the delete copy version, which indicates the component entry 50 is for the copy version to delete. If so, then that component entry 50 is deleted (at block 208) from the copy database 16 and control proceeds to block 222 to consider the next component entry in the database.

If (at block 206) the start 54 and end 56 copy versions do not identify the delete copy version, then a determination is made (at block 210) whether the start copy version 54 of the considered component entry 50 precedes the delete copy version point-in-time and the end copy version 54 identifies the delete copy version. If so (from the yes branch of block 210), then the copy manager 10 sets (at block 214) the end copy version 56 to a most recent existing previous copy version preceding the delete copy version, which could be equal or greater than the start copy version, i.e., closest in time to the end copy version 56 (also the delete copy version in this case). This updates the component entry 50 being considered to indicate that the component values 58 are valid only through the most recent existing previous copy version. From block 214, control proceeds to block 222 to consider the next component entry 50 in the copy database 16.

If (at block 210) the start copy version 54 does not precede the delete copy version nor the end copy version identify the delete copy version, then a determination is made (at block 216) as to whether the start copy version 54 identifies the delete copy version and the end copy version follows in time the delete copy version. The end copy version 56 follows the delete copy version if it has a point-in-time greater than the point-in-time of the delete copy version, which also occurs if the end copy version 56 has the open indicator. If so, then the copy manager 10 sets (at block 220) the start copy version 54 of the considered component entry 50 to indicate a most recent existing copy version succeeding the start copy version, which could be equal or less than the end copy version, i.e., closest in time to the start copy version 54, which is also the delete copy version. This updates the component entry 50 being considered to indicate that the component values 58 are valid only from the most recent existing previous copy version to the end copy version. From block 220, control proceeds to block 222 to consider the next component entry 50 in the copy database 16.

If (from the No branch of block 216), the start copy version 54 does not identify the delete copy version nor the end copy version follows in time the delete copy version, then control proceeds to block 222 to consider any further component entries. Control proceeds from the no branch of block 216 to block 222 if the start copy version 54 follows the delete copy version or the end copy version 56 precedes the delete copy version.

FIG. 12-16 provide examples where different copy versions are deleted from the copy database 17, starting from the state of the copy database 16 existing as shown in FIG. 10.

FIG. 12 illustrates an example of changes to the component entries in the example of FIG. 10 after the copy version 1 is deleted. Entries 230 and 232 are shown as deleted because their start 54 and end 56 copy versions identify the delete copy version 1. Component entry 234 for component 1 is updated to increase the start copy version 54 to the next existing copy version 2 because the start copy version 54 identifies the delete copy version and the end copy version 56 exceeds the delete copy version 1 because it is set to the open indicator.

FIG. 13 illustrates an example of the changes to the component entries in the entries of FIG. 12 when copy version 4 is deleted. Entry 236 is updated to update the end copy version 54 which is set to the delete copy version 4, shown in brackets, to a most recent existing previous copy version 3 preceding the delete/end copy version 4.

FIG. 14 illustrates an example of the changes to the component entries in FIG. 13 when copy version 3 is deleted. Entry 240 is deleted because its start 54 and end 56 copy versions are the delete copy version 3. Entry 242 is updated to change the start copy version 54 from indicating the delete copy version 3 to indicate copy version 5, which is the next existing copy version following the start copy version 54, because copy version 4 was previously deleted. Further entry 244 is updated to change the end copy version 56 from the deleted copy version 3 to a most recent existing previous copy version 2 preceding the delete copy version 4.

FIG. 15 illustrates an example of the changes to the component entries in FIG. 14 when copy version 2 is deleted. Entries 246 and 248 are deleted because their start 54 and end 56 copy versions are the delete copy version 2. Entry 250 is updated to change the start copy version 54 from indicating delete copy version 2 to indicate copy version 5, which is the next existing copy version following the start copy version 54 because copy versions 3 and 4 were previously deleted.

FIG. 16 illustrates an example to changes in the component entries in FIG. 15 when the final copy version 5 is deleted. All the entries are deleted because there are no existing versions between the start copy version 54 being deleted and the end copy version because all other copy versions were previously deleted.

Figure 17:
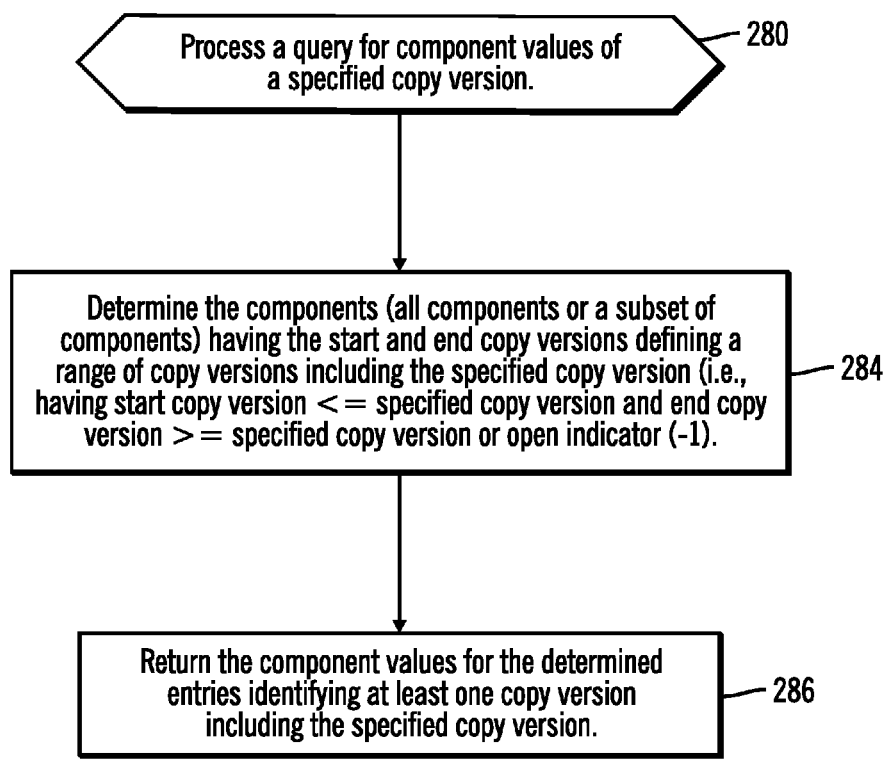
FIG. 17 illustrates an embodiment of operations to query for component values for a copy version.

FIG. 17 illustrates an embodiment of operations performed by the copy manager 10 or other component to process a query for component values from a specified copy version or point-in-time for all the components or a subset of the components 12a, 12b . . . 12n. Upon processing (at block 280) the query, the copy manager 10 determines the components or subset of components in the specified copy by determining (at block 284) the entries 50 in the copy database 16 (all components or a subset of components) having the start 54 and end 56 copy versions defining a range of copy versions including the specified copy version (i.e., having start copy version<=specified copy version and end copy version>=specified copy version or equal to open indicator (−1)). The copy manager 10 returns (at block 186) the component values for the determined entries 50 identifying at least one copy version including the specified copy version.

With described embodiments, a "delta snapshot" mechanism is provided by which only changes in components or the environment need to be stored in the database, rather than complete copies of the state of the environment for each time of a snapshot backup. In this way, unchanged rows do not need to be included in the backup database. The described embodiments substantially reduce the database space required for storing historical environment information, which reduces overall cost as well as improves overall query performance (since the database will be smaller). These cost savings increase available space to save more frequent snapshots, for example the ability to automatically save a snapshot after each significant event that occurs in the environment. Moreover, the described embodiments retain the capability to quickly and efficiently determine the state of the environment at a given point-in-time, which comprises the complete set of database rows that represent the state of environment at a historical time. Further, in additional embodiments, in cases where multiple types of snapshots are needed by the application, the snapshot data rows in the database can be shared between multiple snapshot types.

Described embodiments provide techniques to store component values, such as state and configuration information for devices in a system, in a database that reduces the number of entries needed to maintain the information for component values copied at different points-in-time. With the described embodiments, existing entries in the database for component values at different copy versions are updated to reflect changes to the number of copy versions in a manner that limits the number of new entries that need to be added to the copy database 16.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variables "i" and "n" are used to represent a variable positive integer number indicating a number of instances of an element, such as a number of components (C), copy versions (CV), times (T), etc. These variables associated with different elements may comprise a same or different integer to indicate any variable number of instances of the elements with which the variable is associated.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 18:
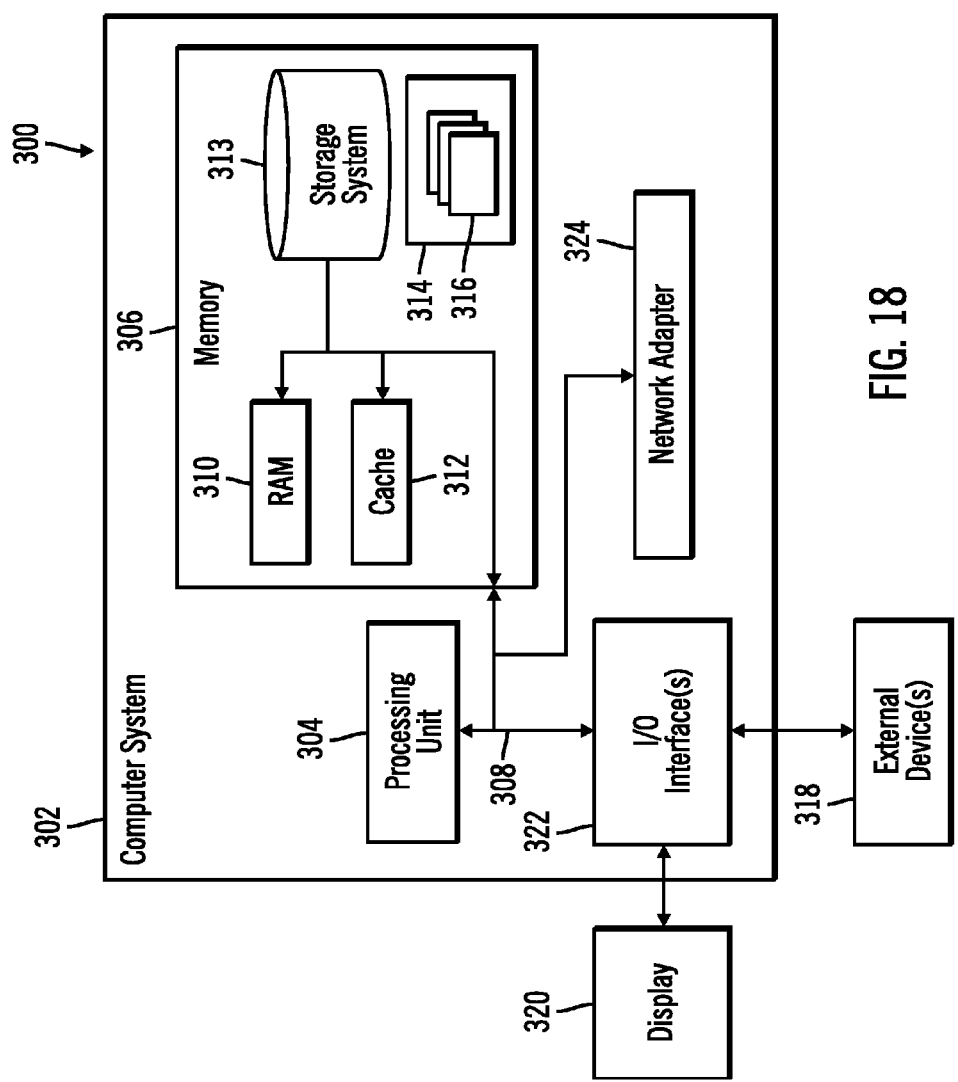
FIG. 18 illustrates an embodiment of a computing environment.

The computer 4 and components 12$a$, 12$b$ . . . 12$n$ may be implemented as one or more program modules in one or more computer systems, such as the computer system 302 shown in FIG. 18. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/ non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components 18, 24, 28, 48, and 50 of the computing environment 2 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for storing copy versions of components in a system, wherein the computer program product comprises a non-transitory computer readable storage medium having computer readable program code embodied therein that executes to perform operations, the operations comprising:

maintaining in a database entries for components in a system, wherein there is one entry for each of a plurality of component values associated with a component, wherein each entry indicates a range of copy versions for which the component value applies, wherein the range of copy versions indicates one of (i) a start copy version and an end copy version defining at least one copy version during which the component value is applicable or (ii) a start copy version and an open indicator indicating that the component value is currently applicable from the start copy version;

performing a copy operation at a current time to create a current copy version;

determining whether the component values for the components at the current time have changed since a previous copy version, wherein the previous copy version is maintained in the database and immediately precedes the current copy version;

for each component value that has changed, updating the entry for the component having a previous value for the component and having the open indicator as the end copy version to indicate the previous copy version as the end copy version; and for each component having the component value that has changed, adding an entry to the database associated with the component indicating the current copy version as the start copy version and the open indicator as the end copy version.

2. The computer program product of claim 1, wherein each entry is associated with a plurality of values for the component, wherein the determining whether the component values for the components have changed comprises:

determining that the component values for one component has changed in response to determining that at least one of the component values for one of the components has changed, wherein the updating of the entry for the component is performed in response to determining that at least one of the component values for the component has changed; and for each component having the at least one component value that has changed, adding an entry to the database indicating the current copy version as the start copy version and the open indicator as the end copy version.

3. The computer program product of claim 1, wherein the operations further comprise:

maintaining copy metadata including an entry for each copy version available in the database;

receiving a delete operation to delete a delete copy version comprising one of a plurality of the copy versions indicated in the copy metadata; and deleting the entry for the delete copy version from the copy metadata.

4. The computer program product of claim 1, wherein the operations further comprise:

receiving a delete operation to delete a delete copy version;

deleting entries in the database having the start copy version and the end copy version identifying the delete copy version;

for each entry in the database having the start copy version identifying the delete copy version and the end copy version following in time the delete copy version, updating the start copy version to indicate an existing copy version having a point-in-time immediately succeeding the start copy version; and for each entry in the database having the end copy version identifying the delete copy version and the start copy version preceding in time the delete copy version, updating the end copy version to indicate a most recent existing previous copy version preceding the delete copy version.

5. The computer program product of claim 1, wherein the operations further comprise:

receiving a query for component values as of a specified copy version;

determining the entries having the start and end copy versions defining a range of copy versions including the specified copy version; and returning the component values for the determined entries identifying at least one copy version including the specified copy version.

6. The computer program product of claim 5, wherein the operations of determining the entries having the start and end copy versions defining a range including the specified copy version comprises determining each entry that has the start copy version less than or equal to the specified copy version and having the end copy version greater than or equal to the specified copy version or having the open indicator.

7. The computer program product of claim 1, wherein the previous copy version comprises a first previous copy version, wherein the operations further comprise:

maintaining copy metadata including an entry for each copy version available in the database;

performing an additional copy operation to generate a new copy version for a subset of the components by performing:

determining whether the component values for the subset of the components have changed since a second previous copy version, wherein the second previous copy version is maintained in the database and immediately precedes the new copy version for the subset of the components;

for each component value for the subset of the components that has changed, updating the entry for the component having the open indicator as the end copy version to indicate the second previous copy version as the end copy version;

for each component of the subset of components having the component value that has changed, adding an entry to the database indicating the new copy version as the start copy version and the open indicator as the end copy version;

adding an entry in the copy metadata for the new copy version; and indicating in the added entry to the copy metadata the subset of the components to which the copy version applies.

8. The computer program product of claim 1, wherein the component values provide state information on an environment of the system including the components, and wherein the entries for each of the copy versions includes component values to provide a state of an environment of the system as of a point-in-time the copy version was created.

9. The computer program product of claim 1, wherein the operations further comprise:

determining whether the component values for the components at the current time have been deleted since a previous copy version, wherein the previous copy version is maintained in the database and immediately precedes the current copy version; and for each component value that has been deleted, updating the entry for the component having the open indicator as the end copy version to indicate the previous copy version as the end copy version.

10. A system for storing versions copy versions of components in a system, comprising:

a processor;

a database including entries for components in a system, wherein there is one entry for each of a plurality of component values associated with a component, wherein each entry indicates a range of copy versions for which the component value applies, wherein the range of copy versions indicates one of (i) a start copy version and an end copy version defining at least one copy version during which the component value is applicable or (ii) a start copy version and an open indicator indicating that the component value is currently applicable from the start copy version; and a computer readable storage medium including code executed by the processor to perform operations, the operations comprising:

performing a copy operation at a current time to create a current copy version;

determining whether the component values for the components at the current time have changed since a previous copy version, wherein the previous copy version is maintained in the database and immediately precedes the current copy version;

for each component value that has changed, updating the entry for the component having a previous value for the component and having the open indicator as the end copy version to indicate the previous copy version as the end copy version; and for each component having the component value that has changed, adding an entry to the database associated with the component indicating the current copy version as the start copy version and the open indicator as the end copy version.

11. The system of claim 10, wherein each entry is associated with a plurality of values for the component, wherein the determining whether the component values for the components have changed comprises:

determining that the component values for one component has changed in response to determining that at least one of the component values for one of the components has changed, wherein the updating of the entry for the component is performed in response to determining that at least one of the component values for the component has changed; and for each component having the at least one component value that has changed, adding an entry to the database indicating the current copy version as the start copy version and the open indicator as the end copy version.

12. The system of claim 10, wherein the operations further comprise:

maintaining copy metadata including an entry for each copy version available in the database;

receiving a delete operation to delete a delete copy version comprising one of a plurality of the copy versions indicated in the copy metadata; and deleting the entry for the delete copy version from the copy metadata.

13. The system of claim 10, wherein the operations further comprise:
- receiving a query for component values as of a specified copy version;
- determining the entries having the start and end copy versions defining a range of copy versions including the specified copy version; and
- returning the component values for the determined entries identifying at least one copy version including the specified copy version.

14. The system of claim 10, wherein the component values provide state information on an environment of the system including the components, and wherein the entries for each of the copy versions includes component values to provide a state of an environment of the system as of a point-in-time the copy version was created.

15. A method for storing copy versions of components in a system, comprising:
- maintaining in a database entries for components in a system, wherein there is one entry for each of a plurality of component values associated with a component, wherein each entry indicates a range of copy versions for which the component value applies, wherein the range of copy versions indicates one of (i) a start copy version and an end copy version defining at least one copy version during which the component value is applicable or (ii) a start copy version and an open indicator indicating that the component value is currently applicable from the start copy version;
- performing a copy operation at a current time to create a current copy version;
- determining whether the component values for the components at the current time have changed since a previous copy version, wherein the previous copy version is maintained in the database and immediately precedes the current copy version;
- for each component value that has changed, updating the entry for the component having a previous value for the component and having the open indicator as the end copy version to indicate the previous copy version as the end copy version; and
- for each component having the component value that has changed, adding an entry to the database associated with the component indicating the current copy version as the start copy version and the open indicator as the end copy version.

16. The method of claim 15, wherein each entry is associated with a plurality of values for the component, wherein the determining whether the component values for the components have changed comprises:
- determining that the component values for one component has changed in response to determining that at least one of the component values for one of the components has changed, wherein the updating of the entry for the component is performed in response to determining that at least one of the component values for the component has changed; and
- for each component having the at least one component value that has changed, adding an entry to the database indicating the current copy version as the start copy version and the open indicator as the end copy version.

17. The method of claim 15, further comprising:
- maintaining copy metadata including an entry for each copy version available in the database;
- receiving a delete operation to delete a delete copy version comprising one of a plurality of the copy versions indicated in the copy metadata; and
- deleting the entry for the delete copy version from the copy metadata.

18. The method of claim 15, further comprising:
- receiving a query for component values as of a specified copy version;
- determining the entries having the start and end copy versions defining a range of copy versions including the specified copy version; and
- returning the component values for the determined entries identifying at least one copy version including the specified copy version.

19. The method of claim 15, wherein the component values provide state information on an environment of the system including the components, and wherein the entries for each of the copy versions includes component values to provide a state of an environment of the system as of a point-in-time the copy version was created.

\* \* \* \* \*